Jan. 10, 1967   P. H. GRANT ETAL   3,297,397
COMBINED FOOTAGE COUNTER AND END OF FILM RUN INDICATOR
MECHANISM FOR MOTION PICTURE CAMERA
Filed Oct. 2, 1964   2 Sheets-Sheet 1

Inventors
Peter H. Grant
Arthur C. Mueller
By Barry L. Clark
John E. Peek Jr.   Attys

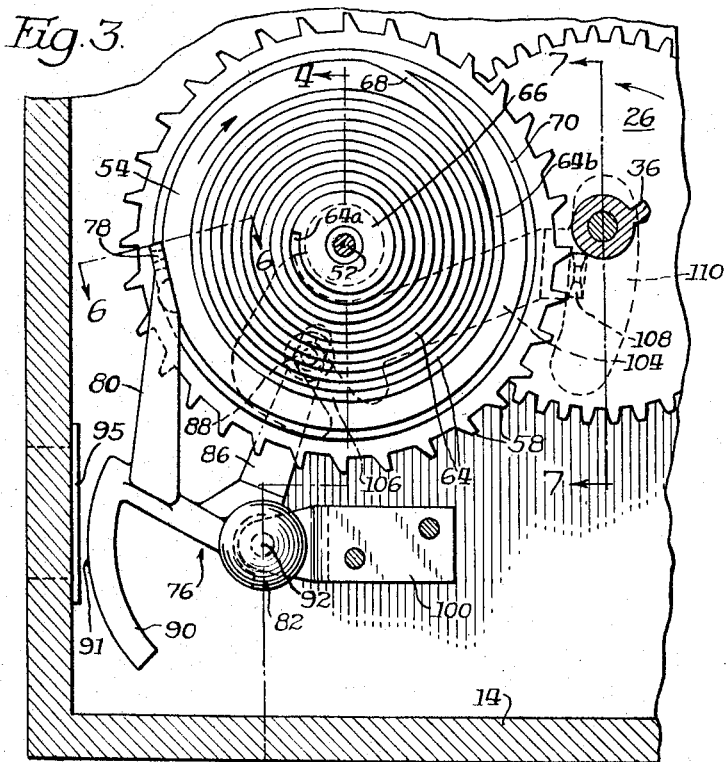
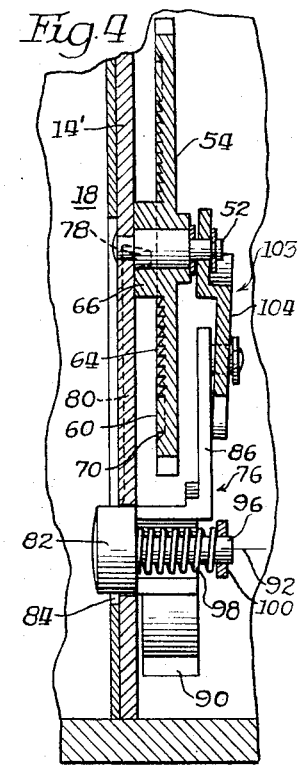
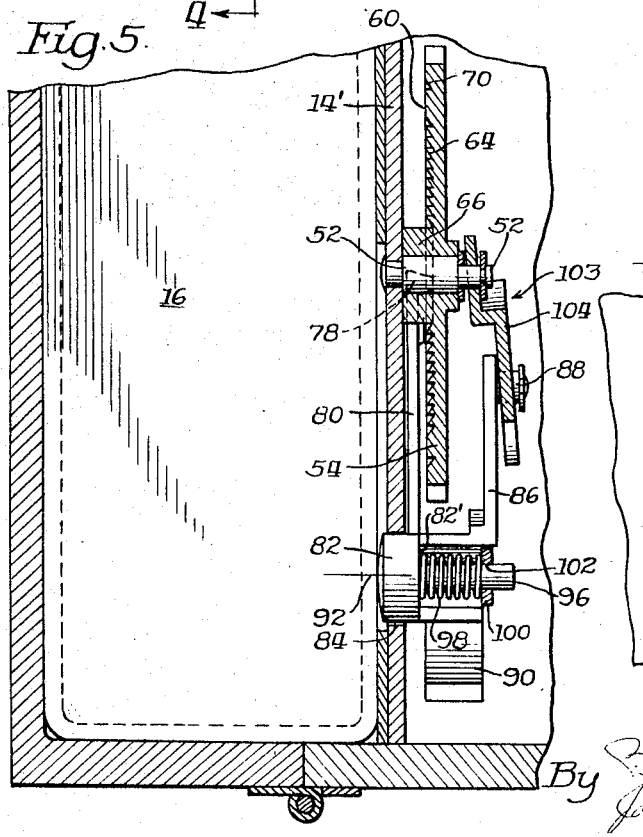
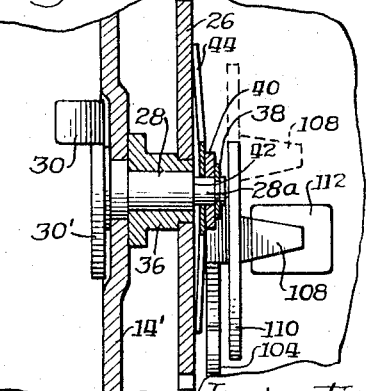

United States Patent Office 3,297,397
Patented Jan. 10, 1967

3,297,397
COMBINED FOOTAGE COUNTER AND END OF FILM RUN INDICATOR MECHANISM FOR MOTION PICTURE CAMERA
Peter H. Grant, Lincolnwood, and Arthur C. Mueller, Niles, Ill., assignors to Bell & Howell Company, Chicago, Ill., a corporation of Illinois
Filed Oct. 2, 1964, Ser. No. 401,161
15 Claims. (Cl. 352—172)

The present invention relates to motion picture cameras, and more particularly to a mechanism to be incorporated in such cameras to indicate to the camera operator the number of feet of film exposed in the camera and to also notify the operator of the end of the film run.

Many types of footage counters are available in the prior art. Some are relatively complex and require an undesirably large number of elements. It is also known that some prior art cameras have included end of the film run indicators in the view-finder of the camera. However, a footage counter and an end of the film run indicator using a minimum number of relatively simple and economically formed elements has not been previously proposed.

An object of the present invention is to provide a novel and low cost means for apprising the operator of a camera of the number of feet of film which he has exposed.

Another object of the invention is to provide a novel construction of an end of the film run indicator which alerts the camera operator that only a few feet of film remain to be exposed.

Yet another object of the invention is the provision of a novel footage counter and an end of the film run indicator mechanism powered by the drive motor of the camera and operating at a greatly reduced gear ratio from the motor rate.

Still another object of the invention is the provision of a novel automatically resetting footage counter mechanism actuated for counting by insertion of a fresh film cartridge in the film chamber of the camera and subsequently returned to its initial position by removal of the film cartridge from the film chamber.

Further objects of the invention will appear from the description as hereinafter set forth in connection with the appended claims and the accompanying drawings wherein:

FIG. 3 is a more enlarged plan view of a portion of the mechanism of the invention.

FIG. 4 is a view taken along section line 4—4 of FIG. 3 with the film chamber of the camera empty.

FIG. 5 is a similar view along section line 4—4 of FIG. 3 with the cartridge present in the film chamber.

FIG. 6 is an end view of the rider and a portion of the guide disk taken along section line 6—6 of FIG. 3.

FIG. 7 is a detail view taken along section line 7—7 of FIG. 3 showing the alternative positions of the end of the film run indicator relative to the viewfinder window.

Figure 1:
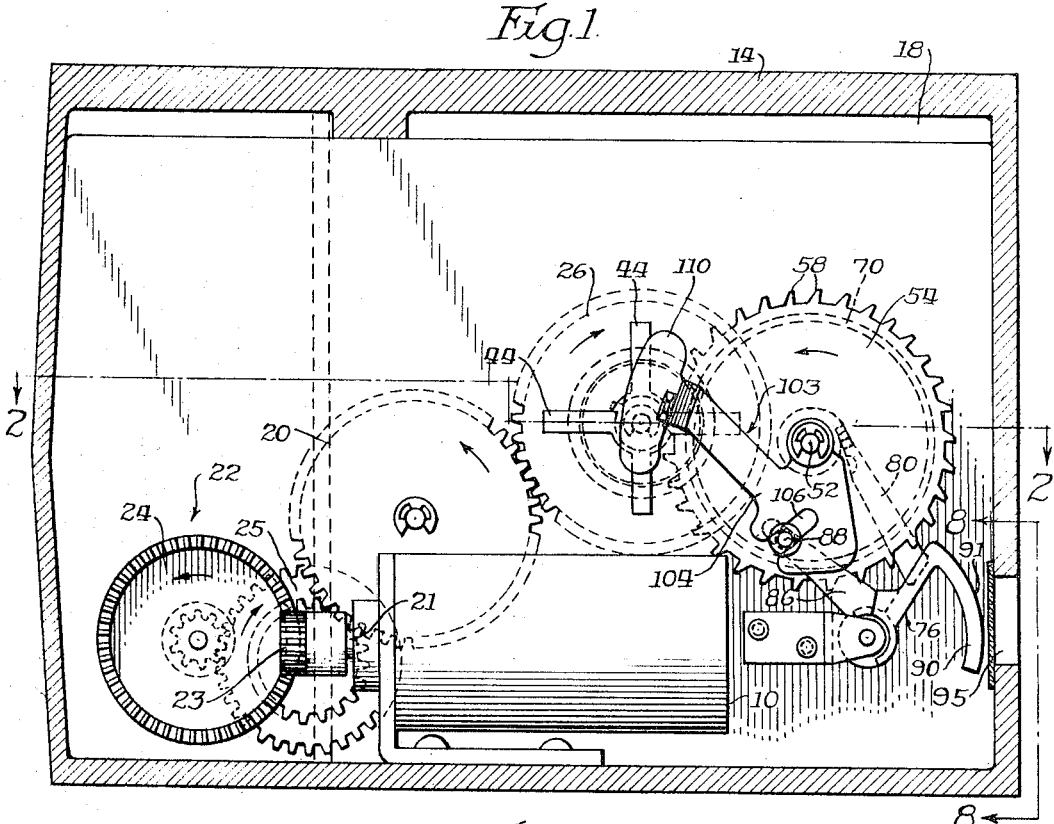
FIG. 1 is a slightly enlarged elevational view of a section disclosing the novel mechanism mounted in a camera.
Figure 2:
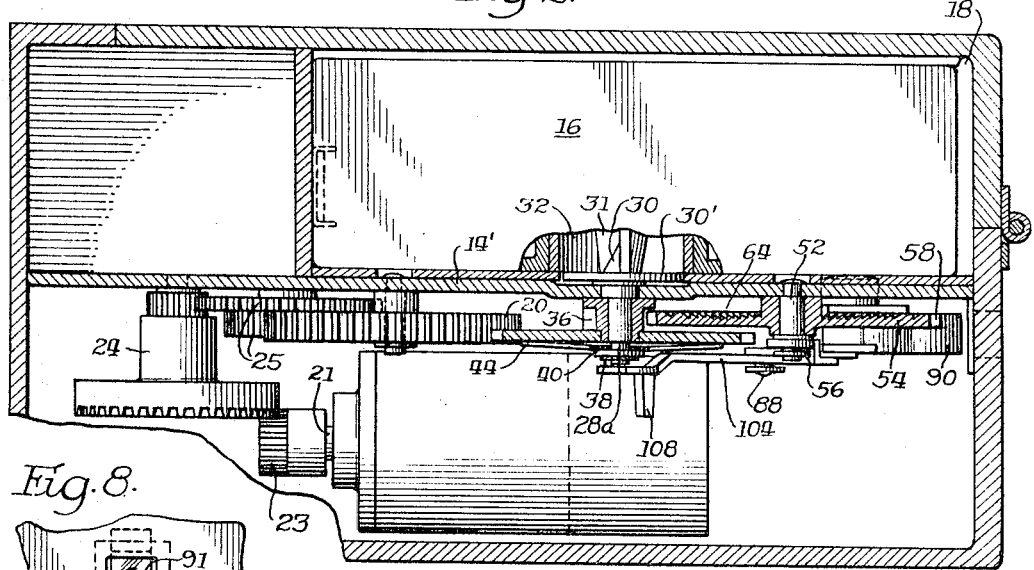
FIG. 2 is a view of the mechanism taken along section line 2—2 of FIG. 1.
Figure 8:
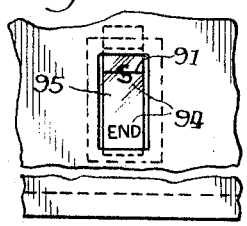
FIG. 8 is a detail view of a preferred embodiment of the footage counter taken along section line 8—8 of FIG. 1.

Referring to the drawings, a conventional drive motor 10 is mounted in camera housing 14 to operate the normally powered elements of the camera. To drive the film (not shown) in cartridge 16, which is inserted into the film or cartridge chamber 18, a driving gear 20 is mounted so as to be powered by the shaft 21 of drive motor 10. The gear 20 is driven through certain gears 23, 24, 25 which form a speed reduction unit 22. The driving gear 20 rotates in mesh with a driven gear 26 keyed against rotation relative to the body portion 28 of a film driving key 30 (as seen more clearly in FIG. 7) which seats in a key slot 31 in the hub 32 of cartridge 16. Actuation of the drive motor 10 thus causes driving of the film past the film gate (not shown) of cartridge 16 and the The tooth ratios and diameters of speed reduction unit 22, the driving gear 20 and driven gear 26 are selected to cause a substantial reduction in the rate of rotation of the film driving key 30 relative to the rate of rotation of the motor shaft 21. Surrounding, and frictionally held for rotation with and relative to the body portion 28 is a skipped tooth or incomplete gear 36 preferably being of the disclosed one tooth type. An E-ring 38 maintains a washer 40 upon a reduced portion 28a of the body portion 28. Between the wsaher 40 and the shoulder 42 of the body portion 28 is a multi-arm resilient member, such as a spring 44. Each arm is held in frictional slipping engagement with a surface of driven gear 26 by the pressure applied thereto by the presence of washer 40 in similar slipping engagement. Gear 26 is keyed to the one tooth gear 36 to cause the gear 36 to rotate therewith. The E-ring thus maintains the above noted elements fixed insofar as axial non-rotative movements relative to a mechanism plate 14' mounted on or a part of housing 14. A raised peripheral portion of a flange 30' of key 30 rides on plate 14' to prevent rocking of the key in the plate.

A shaft 52 is also mounted in the mechanism plate 14' parallel with but spaced from the axis about which film driving key body portion 28 rotates. An output or guide disk 54, preferably formed of a moldable material, such as plastic, is mounted on shaft 52 for rotation relative thereto and is held on the shaft by another E-ring 56. About the periphery of disk 54 are a plurality of spaced gear or pawl teeth 58. The axis about which gear 54 rotates is positioned to permit each of the pawl teeth 58 to be successively engaged by the one tooth of gear 36 as this gear is rotated by driven gear 26. Thus, for each complete rotation of key 30, the guide disk is incrementally rotated or impulsed an angular distance equal to the angular space between similar portions of two adjacent gear teeth 58.

On a planar face 60 of guide disk 54 is a guide portion formed as an elongated spiral or cam guide groove 64 extending from a point 64a adjacent hub portion 66 of the disk outwardly substantially to the periphery of the disk in substantially uniformly spaced concentric convolutions. The final convolution of spiral guide groove 64 forms a more steeply inclined lead off guide groove portion 68 and an indicator control groove portion 70 spaced from the last uniformly space guide groove 64b by a distance greater than the uniform spacing. As disclosed, groove portion 70 is in the form of a ring to permit continued rotation of guide disk 54 but it may be an arcuate groove of only a few degrees arcuate length, if desired. Guide portions 64, 68, 70 are thus seen to form a continuous guide path by which an element will be guided as the disk rotates. The lead off guide groove 68 causes such a guided element to be moved radially outwardly from the disk hub 66 at a relatively rapid rate as compared to the slower substantially radial motion generated by the uniformly spaced concentric guide groove 64.

Cooperating with and guidably moved by the various guide portions 64, 68, 70 of disk 54 is a cam or guide engaging assembly 76. As seen in FIG. 3, this one-piece assembly, which is preferably formed of a molded relatively rigid but yieldable material, such as plastic, includes: a rider member 78 angularly extending from an extended end of an arm portion 80; a button portion 82, movable into cartridge chamber 18 through opening 84 in mechanism plate 14'; a control arm 86 having a connection portion, for example, pin 88, near the end thereof; and a footage counter portion 90 having a reference line or indicia 91 thereon. This assembly is mounted for axial and rotational motion relative to an axis 92 which extends through button portion 82. An upright extension 96 integral with button 82 serves as a standard about which a biasing element, such as a torsion-compression spring 98, is positioned to urge button 82 into the cartridge chamber 18 and to also rotatably urge the assembly in a clockwise direction as disclosed in FIG. 3, thus urging rider member 78 toward hub portion 66 of disk 54. Spring 98 is held about extension 96 between an ear 100, which is fixed to mechanism plate 14′, and a shoulder portion 82′ of button 82. The extension standard 96 passes through an aperture 102 in ear 100.

Connection pin 88 of guide engaging assembly 76, as well as the other portions of the unitary assembly, are caused to be rotatably moved about axis 92 when the rider member 78 is in engagement with the guide grooves 64, 68, 70 on the disk 54, and are returned to an initial position by spring 98, when disengaged therefrom. It is to be noted that the effective path of movement of pin 88, rider member 78, etc., although slightly arcuate, is a substantially radial path relative to the axis of rotation of disk 54.

An indicator assembly 103 including a stepped plate portion 104 is mounted to be moved by the guide engaging assembly 76 about a pivot axis through the shaft 52 and parallel with, but spaced from, axis 92 about which the guide engaging assembly rotates. A connection, e.g. slot portion 106, is formed in the indicator assembly to cooperate with pin connection 88 to cause rotation of the indicator assembly as the guide engaging assembly rotates. A signal portion 108 extends at an angle, preferably perpendicularly, from an arcuate portion 110 of the indicator assembly 103. In the preferred embodiment, this signal portion, before the guide engaging member reaches indicator control groove 70, is not visible in a viewfinder 112 (as seen in the dotted line position as seen in FIG. 7). Signal portion 108 is then moved to the full line position so as to be visible through viewfinder 112 when rider member 78 moves into groove 70. The signal portion may be actuated in other locations than the viewfinder so long as it will alert the camera operator by the rapid change of position caused by the motion of the guide engaging assembly in the latter guide path portions of disk 54.

When the button 82 is engaged by insertion of a cartridge 16 into film chamber 18, the indicator assembly 103 is slightly pivoted relative to shaft 52 and relative to the pin and slot connection (as seen in FIGS. 4 and 5) because of the longitudinal motion of the guide engaging assembly 76. Pin 88 has sufficient longitudinal length to permit relatively free motion of slot 106 about it, both in terms of sliding motion of the pin in the slot and pivoting motion longitudinally of the pin.

In the preferred embodiment of the mechanism, the speed reduction unit, the associated gears and the spacing between the teeth on the periphery of disk 54 are related to the rate of rotation of drive motor 10 at a ratio of 96,000 to 1. This reduction ratio is obtained in the following manner: assuming that the drive motor operates at a rate of approximately 3,000 revolutions per minute; the combination of the speed reduction unit 22, driving gear 20 and driven gear 26 is selected to reduce the rate of rotation such that the one tooth of skipped tooth gear 36 rotates once for each 100 revolutions of motor drive shaft 21, each time engaging one of the 32 pawl teeth of disk 54. The disk thus rotates at about three revolutions per minute. The number of complete guide grooves on disk 54 is selected at 11 such that the rate of angular motion of the guide engaging assembly 66 about axis 92 is further reduced and slightly in excess of 11 revolutions of disk 54 are required to move the rider 78 to the lead off groove 68 and the indicator control groove portion 70. Thus, the feeding of the entire 50 foot length of film through the camera taking a little less than four minutes, results in only approximately 30 degrees of movement of the footage counter indicia mark 91 relative to the reference marks 94 in window 95 in the camera housing 14. The number of teeth about skipped tooth gear 36 and the number of guide grooves 64 or the number of pawl teeth 58 on disk 54 may be modified to permit using the concept of the invention when feeding a different length of film.

It is noted that the tremendous reduction ratio enables the guide grooves to be of a substantial size with greater spacing between adjacent grooves than attempting to form extremely minute grooves on a directly geared or driven disk. Thus, the guide engaging member may likewise be of more substantial construction. These larger sizes permit economical mass production from known moldable materials.

When the camera operator loads a fresh film cartridge 16 in the film chamber 18 in the camera housing 14, a portion of the cartridge engages button portion 82 of the guide engaging assembly 76. The button portion is thus pressed from the position of being biased inwardly of the film chamber 18 as seen in FIG. 4 to a position outwardly of the film chamber as seen in FIG. 5. This pressing motion causes the assembly to be moved axially along the pivot axis 92 against the biasing compression of spring member 98. Rider member 78 then engages the initial portion 64a of cam groove 64 adjacent the hub 66 of the guide disk 54. Drive motor 10 is subsequently operated by the actuation of the conventional camera start button (not shown). As the motor turns, driving gear 20 is rotated at a relatively slow rate and the rotation is transmitted to driven gear 26 so as to rotate that gear and the film driving key 30 at a slow rate. The one tooth gear 36, coaxial with gear 26 and the key, is likewise rotated. As the tooth rotates, it engages one of the several gear teeth 58 on the periphery of guide disk 54 to cause slight angular rotation on the disk with each engagement.

As disk 54 is very slowly and incrementally rotated, rider member 78 of the cam engaging assembly 76, is guided to be moved radially away from hub 66. As the rider member moves, the cam engaging assembly as a whole is moved about axis 92 such that the reference line 91 on footage counter 90 is moved past the reference indicia 94 in window 95 of the housing for viewing by the the operator. Control arm 86 of the assembly is similarly rotated causing the pin 88 in the end thereof to move in slot 106 and the indicator assembly 103 to rotate about its axis through shaft 52. Shortly before reference line 91 is aligned with footage counter indicia "END," rider member 78 has reached the lead off guide groove 68 on guide disk 54. As it rides along this relatively sudden deviation to indicator control groove portion 70 of the guide path, indicator assembly 103 is relatively rapidly moved by the pin and slot connection such that the signal portion 108 appears in the viewfinder 112 to notify the camera operator that he is exposing the last few feet of film in the cartridge 16.

All the film in cartridge 16 having been exposed, the operator now removes the cartridge from the film chamber 18, releasing button 82. Biasing spring 98 is now able to move the rider member 78 away from the groove portion 70 and to substantially simultaneously cause the rider member to be moved inwardly toward the hub 66 adjacent the innermost spiral guide groove 64 of guide disk 54 in preparation for a new cartridge. Thus, the camera is automatically reset and when a new cartridge is inserted in the film chamber will repeat the measuring and appraisal sequence.

Although referred to as a rotatable guide disk, member 54 may be of a cylindrical construction having the spiral guide groove extending axially of the cylinder and gear teeth extending from either the cylindrical surface adjacent one end of the cylinder or an end surface perpendicular to the cylindrical surface. Similarly, although the description of the present invention has been directed to actuation of the mechanism upon insertion of a cartridge into the film chamber, it is to be understood that the actuation may be obtained in other ways, such as by operation of the film chamber door.

It will be understood that modification and variations may be effected without departing from the scope of the novel concepts of the present invention.

We claim as our invention:

1. An indicator mehanism for use in a motion picture camera having a housing, a view-finder associated therewith, and a drive motor in the housing, comprising:
   guide means in operable connection with said drive motor;
   an elongated guide path at least partially formed as a substantially uniformly space spiral on said guide means and terminating in a control portion;
   guide engaging means to engage said path so as to be moved as said guide means is moved; and
   means to indicate when said guide engaging means is moved along said path and into said control portion, a part of said last named means being visible in said viewfinder when said guide engaging means is in said control portion.

2. A mechanism for use in a motion picture camera having a housing and a drive motor in the housing, comprising:
   speed reduction means operably connected to said drive motor;
   guide means operably connected to said speed reduction means to be slowly moved thereby;
   substantially continuous guide path having a terminal portion formed on said guide means;
   means to be moved slowly when in engagement with said guide path and to be moved more rapidly when in engagement with said terminal portion of said path;
   said guide engaging means including an indicator means movable relative to a reference mark in the housing; and
   an end of the run indicator connected to said guide engaging means to be moved to indicate when said guide engaging means is in engagement with said terminal portion of said guide path.

3. An indicator mechanism for use in a motion picture camera having a drive motor, comprising:
   rotatable guide means driven by said drive motor;
   an elongated guide groove forming a plurality of substantially uniformly spaced, concentric spiral convolutions on said guide means, a control convolution portion spaced from said spiral convolutions by a distance greater than the uniform spacing between said spiral convolutions, and a lead off convolution portion connecting said spiral convolutions and said control convolution portion to form a continuous path;
   guide engaging means adapted to be guidedly moved relative to said groove as film is exposed in said camera; and
   an indicator member movable by said guide engaging means to indicate when said guide engaging means is in engagement with said lead off convolution portion and said control convolution portion of said path whereby the indicator member is moved a substantial degree to signal the operator of the camera that the end of the film is being approached.

4. Apparatus for use in a motion picture camera, including a housing, a drive motor, a viewfinder and a film cartridge chamber, to indicate the amount of film exposed and the end of the film run, the apparatus comprising:
   driving gear means driven by the drive motor;
   skipped tooth gear means rotatable in operative relation with said driving gear means;
   guide disk means having a plurality of pawl teeth on one surface thereof and an elongated guide path formed as a uniformly spaced spiral portion terminating in a control portion spaced from the last spiral portion and connected thereto by a lead off portion on another surface of the disk means;
   said pawl teeth being adapted to be engaged by at least one tooth of said skipped tooth gear means wherein said disk means is incrementally rotated;
   a pivotable guide engaging member including a rider portion, an arm, button means and footage counter means;
   said rider portion being adapted to be guided along said guide path as said disk means is rotated wherein said rider portion is moved thereby toward the periphery of said disk;
   said footage counter means being movable relative to reference means in said housing as said rider portion is pivoted;
   spring means adapted to normally urge said guide engaging member toward the central portion of said disk means and to normally bias said button means into said film chamber;
   a first connection means on said arm; and
   a second pivotable means including a second connection means and a signal portion adapted to be moved by said pivoted guide engaging member;
   said connection means cooperating with one another wherein said signal portion on said second pivotable means is adapted to be moved into said viewfinder when said rider portion is guided by said control portion whereby said signal portion is moved in a manner to indicate the end of the film run.

5. A mechanism to indicate the amount of film exposed and the end of the film run adapted for use in a motion picture camera having a housing and a drive motor in the housing, comprising:
   guide means having a driving connection with said drive motor;
   elongated guide path means on one surface of said guide means;
   said guide path means being formed as a spiral and terminating in an indicator control portion;
   said control portion being spaced from said spiral;
   a lead off portion connecting said spiral and said control portion;
   guide engaging means adapted to engage said spiral of said elongated guide path means to be guided and moved radially thereby until said guide engaging means reaches said indicator control portion;
   said guide engaging means including a footage counter adapted to be moved relative to indicia in said housing as said guide engaging means is guided for movement relative to said surface of said guide means; and
   an indicator means being movable by said guide engaging means to indicate when said guide engaging means is in engagement with said control portion whereby said indicator means is moved a substantial amount to indicate the end of the film run.

6. A mechanism for use in a motion picture camera having a housing, a drive motor, a viewfinder and a film chamber in which a cartridge of film may be inserted, to indicate the amount of film exposed and the end of the film run, the mechanism comprising:
   driving gear means driven by the drive motor;
   one tooth gear means rotatable by said driving gear means;
   guide disk means having a plurality of pawl teeth on the periphery thereof and an elongated spiral guide groove on another surface thereof;
   said disk means being angularly rotated one increment when said one-tooth gear means is rotated to engage one of the teeth of said disk;
   adjacent portions of said spiral grooves being substantially uniformly spaced one from another;

an indicator control groove portion spaced from the last spiral groove a distance greater than said uniform spacing between said other grooves;

a lead groove connecting said last spiral groove to said control groove portion to form a continuous path;

pivotable guide engaging means including a rider portion, an arm and a footage counter element;

button means on said guide engaging means to cause said rider portion to engage said spiral guide grooves when a cartridge is in said film chamber;

said rider portion being adapted to be moved substantially radially by said spiral guide grooves of said disk to said control groove portion adjacent the periphery of said disk as said guide engaging means is pivoted;

said footage counter element being movable relative to indicia in a window in said housing;

means engaging said guide engaging means to normally bias said rider portion thereof away from said disk means and toward the initial portion of said guide groove on said disk means wherein said button means is biased into said film chamber when said rider portion is returned to said initial portion of said disk means when the cartridge is removed from the chamber;

pin connection means extending perpendicularly of said arm; and an indicator means having a slot connection means cooperating with said pin connection means;

said indicator means being adapted to be moved into said camera viewfinder through movement by said pin and slot connection means when said rider portion is in said guide groove portion whereby the end of the film run is indicated.

7. A device to indicate the amount of film exposed and the end of the film run, adapted for use in a motion picture camera having a housing and a drive motor, comprising:

speed reduction means operably connected to said drive motor;

rotatable guide disk means operably connected to said speed reduction means, said disk means having a planar portion perpendicular to its axis of rotation;

guide path means on said planar portion;

said guide path means being formed as an elongated spirial portion terminating in an indicator control portion, said control portion being spaced from said spiral portion;

a lead portion connecting said spiral portion and said control portion;

one-piece guide engaging means including a rider portion adapted to engage said spiral portion and said control portion to be guided thereby, wherein said rider portion is caused to be moved outwardly along the guide path until it reaches the guide portion as said guide disk means is rotated;

said guide engaging means including a first reference means adapted to be moved relative to a second reference means in said housing as said guide engaging means is moved by said rider portion; and a signal means being movable by said guide engaging means to indicate when said rider portion is in engagement with said control portion whereby said signal means is moved a substantial degree to indicate the end of the film run.

8. A device as in claim 6:

said camera housing having a film chamber into which a cartridge containing a length of film is inserted to be exposed and an opening in a wall of said film chamber;

said guide engaging means being mounted to be moved by biasing means normally urging said rider portion of said guide engaging means away from said disk means;

button means on said guide engaging means adapted to be urged through said opening into said chamber and to move said rider portion into engagement with said guide disk when said button portion is engaged by a cartridge in said chamber against the urging of said biasing means.

9. A device as in claim 6:

said speed reduction drive means including a speed reduction unit to rotate a driving gear driven by said drive motor;

a driven gear adapted to be rotated by said driving gear; and a one-tooth gear, coaxial with, and rotated by said driven gear;

said rotatable guide disk means having a plurality of angularly spaced pawl teeth on the periphery thereof adapted to be engaged by said one-tooth gear to incrementally rotate said disk means.

10. An indicator mechanism for use in a motion picture camera having a housing, and a drive motor and a film chamber in the housing adapted to contain a length of film to be exposed, comprising:

a rotatable guide disk in driving connection with said drive motor;

an elongated groove formed on said disk as a spiral portion with substantially uniformly spaced convolutions;

a control groove portion spaced from a part of said spiral portion by a distance greater than the uniform spacing between said convolutions;

a lead portion connecting said convolutions and said control groove portion to form a continuous guide path;

guide engaging means including a rider member adapted to engage said groove so as to be moved as said disk is rotated;

said guide engaging means further including a footage counter mechanism movable relative to a reference mark in the housing as said guide engaging means is moved; and means to indicate the end of the film run when said guide engaging means is moved in engagement with the control portions of said groove;

whereby said indicator means is caused to be moved with a relatively rapid motion to indicate that substantially the entire length of film in the film chamber has been exposed.

11. Apparatus for use in a motion picture camera, including a housing having indica thereon, a drive motor, and a film cartridge chamber, to indicate the amount of film exposed at the end of the film run, the apparatus comprising:

driving gear means driven by the drive motor;

one tooth gear means rotatable in cooperation with said driving gear means;

guide means having a plurality of pawl teeth on one surface thereof and a plurality of guide portions on another surface thereof, said pawl teeth being adapted to be sequentially engaged by said one tooth of said gear means wherein said disk means is incrementally rotated;

guide engaging means adapted to be moved when engaging said guide portion on said guide means;

means on said guide engaging means to indicate the amount of film exposed in the camera as said guide engaging means is moved relative to said indicia in said housing; and an end of the film run indicator movable by said guide engaging means to indicate when said guide engaging means engages one of the guide portion of the guide means.

12. A mechanism to indicate the amount of film exposed and the end of the film run, adapted for use in a motion picture camera having a housing having indicia on a portion thereof and a drive motor in the housing, comprising:
- guide means having a driving connection with said drive motor;
- guide engaging means to engage at least a portion of said guide means, said guide engaging means including a footage counter mechanism adapted to be moved relative to said indicia in said housing when said guide engaging means is moved relative to said guide means; and
- indicator means movable by said guide engaging means to indicate when said guide engaging means is in engagement with a selected portion of said guide means.

13. A mechanism for use in a motion picture camera having a housing, a drive motor and a film chamber into which a cartridge of film may be inserted, to indicate the amount of film exposed and the end of the film run, the mechanism comprising:
- guide disk means operably connected to be rotatably and incrementally driven by the drive motor;
- guide engaging means movable when in engagement with said guide disk means;
- biasing means to normally bias said guide engaging means away from said disk means;
- means on said guide engaging means to cause said guide engaging means to engage said guide disk means against the biasing of said biasing means when actuated by a cartridge inserted in said film chamber; and
- a footage counter means and an end of the film run indicator means operably connected to said guide engaging means whereby the amount of film exposed in the camera and the end of the film run are indicated.

14. A mechanism for use in a motion picture camera having a housing, a drive motor and a film chamber into which a cartridge of film may be inserted, to indicate the amount of film exposed and the end of the film run, the mechanism comprising:
- guide means operably connected to be incrementally driven by the drive motor;
- guide engaging means movable by said guide means when in engagement therewith;
- biasing means to normally bias said guide engaging means away from said guide means;
- means adapted to be actuated to cause said guide engaging means to engage said guide means against the biasing of said biasing means; and
- a footage counter means and an end of the film run indicator means operably connected to said guide engaging means whereby the amount of film exposed in the camera and the end of the film run are indicated.

15. An indicator mechanism for use in a motion picture camera having a housing and a drive motor in the housing, comprising:
- guide means in operably driven connection with said drive motor;
- an elongated guide path at least partially formed as a substantially uniformly spaced spiral on said guide means;
- a control portion of said path spaced from said spiral portion by a distance greater than the uniform spacing between said spiral portion;
- a lead portion of said path connecting said spiral convolutions and said control portion to complete said elongated path;
- guide engaging means adapted to engage said path and last named portions of said path so as to be moved thereby;
- means to indicate the amount of film exposed in said camera;
- reference means to determine the relative position of said indicator means;
- one of said means being movable by said guide engaging means relative to said other means in said housing; and
- means to indicate the end of the film run;
- said last named means is moved a substantial distance by said guide engaging means when said guide engaging means traverses said lead portion onto said control portion.

References Cited by the Examiner

UNITED STATES PATENTS

| 1,142,670 | 6/1915 | Cameron | 274—15 |
| 2,229,848 | 1/1941 | Harter et al. | 352—171 X |
| 2,392,212 | 1/1946 | Zuber | 352—171 |
| 2,556,770 | 6/1951 | Moore | 352—91 |
| 2,913,247 | 11/1959 | Bailey | 274—42 |
| 3,136,291 | 6/1964 | Irisawa et al. | 95—31 X |

JULIA E. COINER, *Primary Examiner.*

NORTON ANSHER, *Examiner.*

V. A. SMITH, *Assistant Examiner.*